//  United States Patent                                              [11] 3,536,234

| [72] | Inventor | Leif Rise |
|---|---|---|
| | | 735 N. Eucalyptus Ave., Inglewood, California 90302 |
| [21] | Appl. No. | 729,727 |
| [22] | Filed | May 16, 1968 |
| [45] | Patented | Oct. 27, 1970 |

[54] APPARATUS FOR EXPELLING THE CONTENTS OF COLLAPSIBLE TUBE CONTAINERS
25 Claims, 8 Drawing Figs.

[52] U.S. Cl. .................................................. 222/103
[51] Int. Cl. ............................................. B65d 35/28
[50] Field of Search ................................ 222/95, 96, 97, 103

[56] References Cited
UNITED STATES PATENTS
1,790,929   2/1931   Lawton ........................ 222/103

FOREIGN PATENTS
1,183,770   2/1959   France ........................ 222/103
559,600     3/1957   Italy ............................. 222/103

Primary Examiner—Samuel F. Coleman
Attorney—Christie, Parker and Hale

ABSTRACT: A pair of closable jaws are situated opposite to one another. The jaws are adapted to receive the bottom end of a tube between them while they are open and to collapse the walls of the tube without slippage as they close. The surfaces of the jaws coming into contact with the tube are portions of cylinders with parallel axes and are provided with shallow, serrated grooves. A plurality of fingers are movable into engagement with the tube as the jaws open and out of engagement with the tube as the jaws close. The fingers are coupled to bowed springs by transverse, rotatable rods that hold the jaws together. The springs are deformed as the jaws are closed. As the jaws open, the restoring force of the springs move the fingers into engagement with the tube and drive the jaws toward the top end of the tube.

Patented Oct. 27, 1970 3,536,234
Sheet 1 of 2
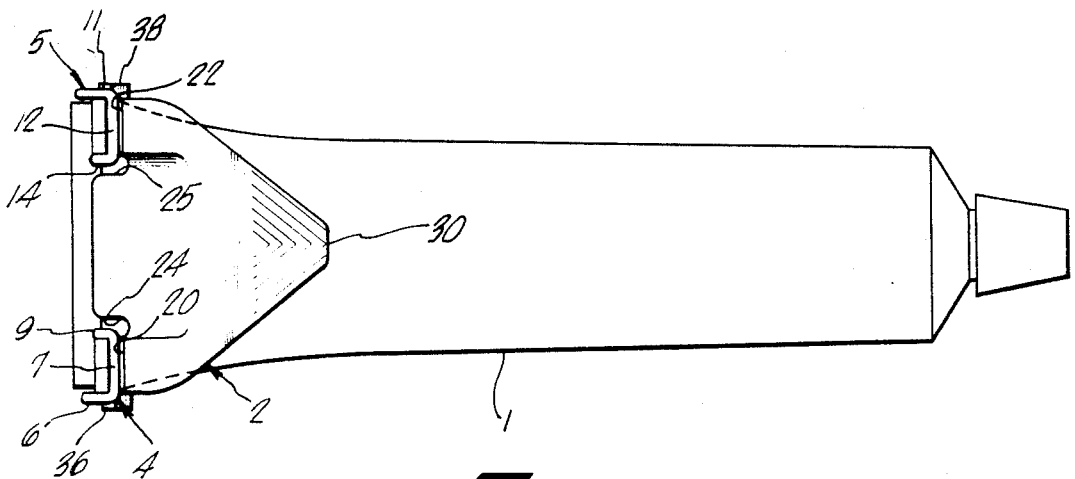
FIG. 2
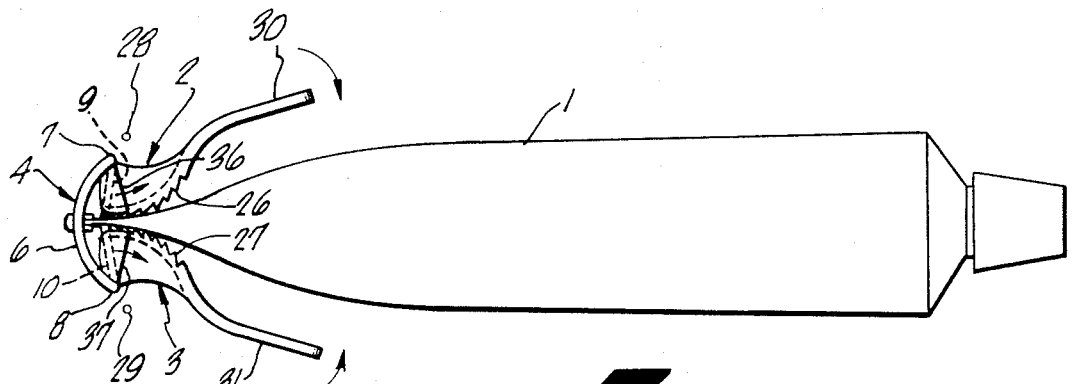
FIG. 1
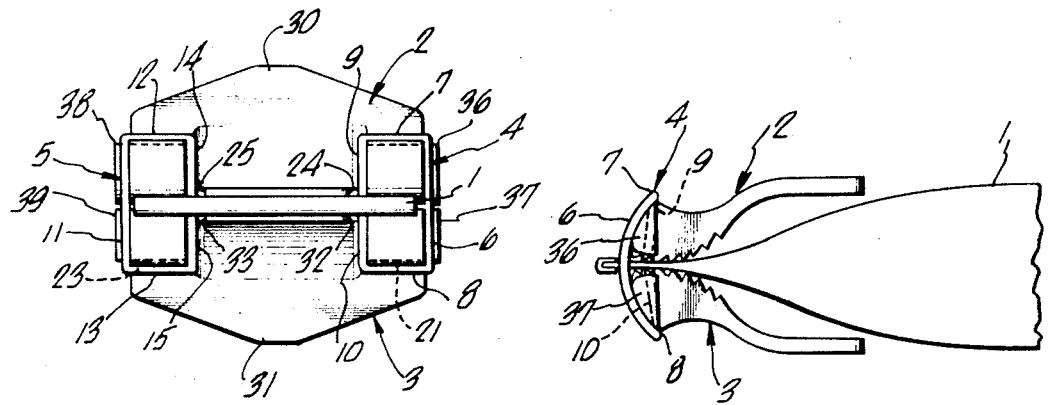
FIG. 3
FIG. 4
INVENTOR.
LEIF RISE
BY
Christie, Parker & Hale
ATTORNEYS.

INVENTOR.
LEIF RISE
BY
Christie, Parker & Hale
ATTORNEYS.

APPARATUS FOR EXPELLING THE CONTENTS OF COLLAPSIBLE TUBE CONTAINERS

BACKGROUND OF THE INVENTION

This invention relates to the problem of dispensing the contents of collapsible tube containers such as tooth paste tubes, and more particularly, to apparatus for expelling the contents of such a tube effectively and conveniently.

Many different types of implements have been devised for use in expelling the contents of collapsible tube containers. The most widely used device is a simple one-piece key with a longitudinal slot through its shank adapted to receive the bottom end of the tube. To expel the contents of the tube, its bottom end is inserted in the slot and the key is turned. As the key is turned, the tube is collapsed and rolled onto the shank of the key. The contents of the tube is thereby forced out of an orifice at the top end of the tube. Although this key type device is simple and cheap to manufacture, it is difficult to use without leaving pockets of material in the tube, which represents waste. In addition, substantial effort is required on the part of the user to roll the entire tube onto the key.

Many attempts have been made to design a more efficient and easily usable device to expel the contents of a tube container. For the most part these devices involve two plates that are pivotable about a common axis. The tube is placed between the plates with the bottom end of the tube along the axis and the plates are squeezed together, thereby collapsing the tube and expelling its contents. Such devices require special care on the part of the user to prevent slippage between the plates and the tube as the plates are being squeezed together. The user must also push the device repeatedly toward the top end of the tube as the bottom end is collapsed.

SUMMARY OF THE INVENTION

The invention contemplates apparatus for efficiently expelling the contents of a collapsible tube container with a minimum of care and effort on the part of the user. The apparatus is designed to be operated with one hand, leaving the user's other hand free to hold another object. A pair of closable jaws situated opposite to one another are adapted to receive the bottom end of a tube between them while they are open and to collapse the walls of the tube without slippage as they close. The surfaces of the jaws that come into contact with the tube during closure are portions of cylinders that have spaced apart parallel axes. As a result, the contents of the tube is expelled at a uniform rate without the formation of pockets as the jaws are closed. Shallow, serrated grooves are preferably formed on these surfaces to engage the tube without slippage as the jaws close. An important feature of the apparatus is the provision of a gripping device, such as a set of fingers, that is movable into engagement with the tube as the jaws open and out of engagement with the tube as the jaws close. Each time the gripping device moves into engagement with the tube, it drives the jaws toward the top of the tube, thereby effecting an incremental advancement of the apparatus along the tube.

One or more springs resist closure of the jaws. Preferably, the spring is formed integral with and operates the gripping device, e.g., transverse, rotatable rods fixed to opposite ends of the spring connect it to inwardly directed fingers. The rods serve to transmit the movement of the spring to the fingers and to hold the jaws together. When the user closes the jaws, the deformation of the spring causes the fingers to rotate in the opposite direction from the rotation of the jaws. Consequently, as the jaws are closed by the user, the serrated surfaces of the jaws rotate into engagement with the tube to expel its contents and the fingers rotate toward the top end of the tube out of engagement with it. As the jaws are released by the user, the spring opens the jaws once again. Thus, the serrated surfaces of the jaws rotate out of engagement with the tube and the fingers rotate back into engagement with the tube, thereby driving the jaws toward the top end of the tube. In this fashion, the jaws are advanced incrementally by the restoring force of the spring each time they return to their open position.

BRIEF DESCRIPTION OF THE DRAWINGS

The features of a specific embodiment of the invention are illustrated in the drawings, in which:

FIG. 1 is a side elevation view of a collapsible tube container and apparatus in its open position which incorporates the principles of the invention;

FIG. 2 is a top plan view of the tube and apparatus of FIG. 1;

FIG. 3 is a back elevation view of the tube and apparatus of FIG. 1;

FIG. 4 is a side elevation view of a portion of the tube and the apparatus of FIG. 1 in its closed position;

DESCRIPTION OF A SPECIFIC EMBODIMENT

Figure 5A:
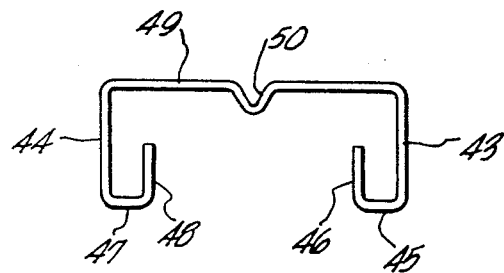
FIGS. 5A and 5B are respectively back and side elevation views of an alternative embodiment of the integral members in FIGS. 1 through 4.

In the drawings, a collapsible tube container 1 is shown with apparatus for expelling its contents. The apparatus comprises jaws 2 and 3 situated opposite to one another and integral members 4 and 5. Integral member 4 has a bowed spring portion 6, transverse rotatable rod portions 7 and 8 situated at the ends of spring portion 6, and finger portions 9 and 10 that extend radially inward from rod portions 7 and 8, respectively. Similarly, integral member 5 has a bowed spring portion 11, transverse rotatable rod portions 12 and 13 connected to the ends of spring portion 11, and finger portions 14 and 15 that extend radially inward from rod portions 12 and 13, respectively. Rod portions 7 and 8 lie in transverse grooves 20 and 21, respectively, formed in the top and bottom surfaces of jaws 2 and 3, respectively. Similarly, rods 12 and 13 lie in transverse grooves 22 and 23, respectively, formed in the top and bottom surfaces of jaws 2 and 3, respectively. When completely relaxed, spring portions 6 and 11 are slightly more bowed than illustrated in FIG. 1. In the open position of the apparatus, which is illustrated in FIG. 1, spring portions 6 and 11 are slightly deformed. Therefore, rod portions 7 and 8 and rod portions 12 and 13 hold jaws 2 and 3 together. Fingers 9 and 14 move within slots 24 and 25, respectively, on the inside of the ribs in jaw 2, and fingers 10 and 15 move within slots 32 and 33, respectively, on the inside of the ribs in jaw 3. Fingers 9 and 10 and fingers 14 and 15 serve as a gripping device that engages tube 1 in the open position, thereby preventing movement of tube 1 in the apparatus.

Surfaces 26 and 27 of jaws 2 and 3, respectively, engage tube 1 as the apparatus closes. Surfaces 26 and 27 are portions of cylinders with spaced apart parallel axes 28 and 29, respectively. It is to be noted that axes 28 and 29 are spaced and offset laterally from grooves 20 and 22 and grooves 21 and 23, respectively. The reason for this is explained below in connection with the description of the operation of the device. Surfaces 26 and 27 have shallow, serrated grooves extending transverse to the length of tube 1. These serrated grooves, which are shown enlarged in FIGS. 1 and 4, permit jaws 2 and 3 to engage tube 1 as they close without slippage. Instead of serrated grooves, surfaces 26 and 27 could be provided with other means for preventing slippage with tube 1, such as tiny dimples, a rough sandpaperlike contour, or staples embedded in the body of jaws 2 and 3 transverse to the length of tube 1. Jaws 2 and 3 have pads 30 and 31 with grooved herringbone patterns for the placement of the user's fingers. A sideward extension 36 of jaw 2 and a sideward extension 37 of jaw 3 serve as stops to prevent excessive deformation of spring portion 6. Similarly, a sideward extension 38 from jaw 2 and a sideward extension 39 from jaw 3 serve as stops to prevent excessive deformation of spring portion 11.

The operation of the device is now considered under the assumption that tube 1 is initially positioned between jaws 2 and 3, as illustrated in FIG. 1. When the fingers of the user press jaws 2 and 3 together, cylindrical surfaces 26 and 27 engage tube 1 near its bottom end. As a result, jaw 2 rotates without slippage about axis 28 in a clockwise direction and jaw 3 rotates without slippage about axis 29 in a counterclockwise direction. As jaws 2 and 3 begin to rotate across tube 1, they push rod portions 7 and 12 and rod portions 8 and 13 away from one another, thereby further deforming and straightening spring portions 6 and 11. As spring portions 6 and 11 begin to straighten, rod portions 7 and 12 rotate in a counterclockwise direction, as viewed in FIG. 1, and rod portions 8 and 13 rotate in a clockwise direction, as viewed in FIG. 1. Consequently, finger portions 9 and 14 and finger portions 10 and 15 rotate out of engagement with tube 1 toward its top end, as illustrated by the arrows in FIG. 1. Upon reaching the closed position of the apparatus, which is depicted in FIG. 4, spring portion 6 moves up against sideward extensions 36 and 37, and spring portion 11 moves up against sideward extensions 38 and 39 so further deformation of spring portions 6 and 11 and therefore further closure of jaws 1 and 2 are prevented.

In closing jaws 2 and 3, the user must overcome the spring tension exerted on jaw 2 by rod portions 7 and 12 and on jaw 3 by rod portions 8 and 13 due to the deformation of the spring portions 6 and 11. Deformation of spring portions 6 and 11, create torque in rod sections 7, 12, 8 and 13. At a specific point in the closing of jaws, fingers 9, 14, 10 and 15 disconnect from the surface of the container and due to the build-up torque in sections 7, 12, 8 and 13, swing towards the opening of the container. In reverse action: at a specific point in opening of the jaws' fingers 9, 14, 10 and 15 make contact with the surface of the container in a nonslipping engagement. As the jaws open to its initial position, the torque in rod section 7, 12, 8 and 13 will not be able to return the fingers to its initial position due to the nonslipping engagement with the tube. The torque in rod section 7, 12, 8 and 13 disengage the jaws' contact with the container and drive them an increment along the length of the tube. The described procedure is repeated to expel more of the contents of tube 1. Each time that jaws 2 and 3 are released, they are advanced incrementally along the length of tube 1 toward its top end by the restoring force of spring portions 6 and 11.

In summary, the jaws and the fingers alternately engage tube 1. While the jaws are closing, they are in engagement with tube 1 and the contents of tube 1 is expelled. While the jaws are opening, the fingers move into engagement with tube 1 as the open position is approached to advance the jaws along the length of tube 1.

The embodiment of the invention disclosed in the drawings employs a minimum of parts to perform the described functions. Apparatus employing more parts would also come within the scope of the invention. For example, spring portions 6 and 11 return jaws 2 and 3 to the open position after the user releases them and rotate fingers 9 and 10 and fingers 14 and 15 into and out of engagement with tube 1. If desired, separate springs could be provided to perform these two functions. Similarly, rod portions 7 and 8 and rod portions 12 and 13 hold jaws 2 and 3 together and couple the rotation of spring portions 6 and 11 to finger portions 9 and 10 and finger portions 14 and 15. These two functions could also be performed by separate parts. In short, many variations from the disclosed specific embodiment are encompassed by the principles of the invention.

The apparatus illustrated in FIGS. 1 through 4 is initially brought into engagement with tube 1 by placing the bottom of tube 1 between jaws 2 and 3 and then alternately closing and opening jaws 2 and 3 until the bottom of tube 1 is engaged. Once the bottom of tube 1 is engaged as illustrated in FIGS. 1 through 4 it can advance only in one direction namely toward the top of tube 1. When the entire contents of tube 1 is expelled, the top end of tube 1 is cut off with a scissors and the apparatus is disengaged by alternately closing and opening the jaws until the apparatus advances beyond the top of the tube. This is the only way that the apparatus can be disengaged from tube 1 after it is once engaged.

Figure 5B:
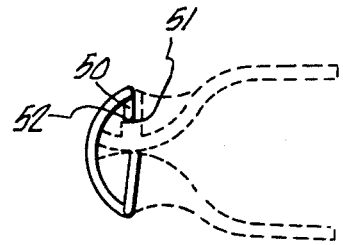

In FIGS. 5A and 5B an alternative embodiment for integral members 4 and 5 is shown, which has a single unit construction. This single unit has spring portions 43 and 44 that could be identical to spring portions 6 and 11 in FIGS. 1 through 4. A transverse rod portion 45 connects one end of spring portion 43 to a finger portion 46 that extends radially inward and a transverse rod portion 47 connects one end of spring portion 44 to a finger portion 48 that extends radially inward. Spring portions 43 and 44, rod portions 45 and 47, and finger portions 46 and 48 could be constructed identically to spring portions 6 and 11, rod portions 8 and 13, and finger portions 10 and 15, respectively, in FIGS. 1 through 4. The difference in this embodiment is that a transverse rod portion 49 connects the other end of spring portions 43 and 44 together instead of having two finger portions that extend radially inward. A tongue portion 50 is formed at the middle of rod portion 49. The embodiment of FIGS. 5A and 5B basically operates with the jaws in the same fashion as described in connection with FIGS. 1 through 4. The jaws employed with this single unit construction are basically the same as the jaws disclosed in FIGS. 1 through 4, with several minor modifications. They are represented in FIG. 5B in phantom by a sectional view taken through the jaws. A rib 51 is added at the center of the jaw where tongue 50 exerts its force so as to provide a bearing surface for it. In addition, tongue 50 is provided with a pocket 52 formed in the rib. When the jaws close, the torque built up in rod portion 49 rotates the tongue towards a pocket 52 in the crossrib. The fingers 46 and 48 advance to a new nonslipping engagement with the tube. As the jaws open, the torque in rod section 49 forces the tongue 50 against the crossrib on the adjacent jaw and advances the jaw at the same rate along the tube, as the jaw adjacent the finger portions 46 and 48. The embodiment of FIG. 5B has the advantage that the jaws can be disengaged at any time and therefore the apparatus can be removed from the tube before all the contents of the tube are expelled. This is done simply by rotating the jaw adjacent rod portion 49 in a direction to open the jaws further until finally the jaws are no longer clamped together by rod portion 49 and rod portions 45 and 47.

Figure 6A:
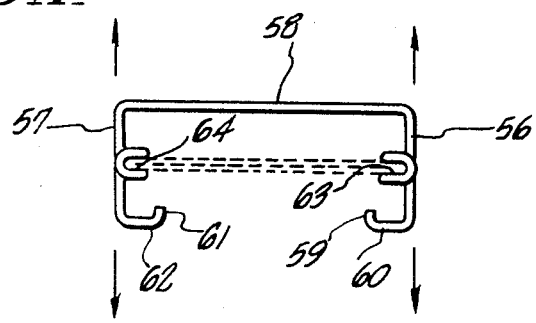
FIGS. 6A and 6B are respectively back and side elevation views of another alternative embodiment of the integral members in FIGS. 1 through 4.
Figure 6B:
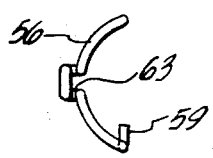

In FIGS. 6A and 6B another single unit alternative embodiment for integral members 4 and 5 in FIGS. 1 through 4 is shown. Spring portions 56 and 57, which could be identical to spring portions 6 and 11, are connected together by a transverse rod portion 58. A short finger portion 59 that extends radially inward is connected to one end of spring portion 56 by a transverse rod portion 60. Similarly, a short finger portion 61 that extends radially inward is connected to one end of spring portion 57 by a transverse rod portion 62. Finger portions 59 and 61 serve to retain rod portions 60 and 62 in the grooves of the adjacent jaw and serve to hold spring portions 56 and 57 in place. They do not engage the tube. Pincers 63 and 64 are formed at the center of spring portions 56 and 57, respectively. The tube lies between a pair of pincers 63 and a pair of pincers 64, as represented in phantom in FIG. 6A. When the jaws are open, pincers 63 and 64 engage the tube. As the jaws are closed, pincers 63 and 64 are spread open and move out of engagement with the tube so they can slide along the flattened surface toward the top of the tube. The arrows in FIG. 6A indicate the direction of movement as the jaws are closed. The jaws could be identical to those disclosed in FIGS. 1 through 4. The embodiment of FIG. 6A cannot be reused with another tube after the tube is evacuated. Preferably, the apparatus would be engaged with the tube in the factory at the time that the tube is filled. The embodiment of FIG. 6A has the advantage that it is particularly well suited for being constructed integral with the jaws by injection molding techniques so the entire apparatus constitutes a single part.

I claim:

1. Apparatus for expelling the contents of a collapsible tube container comprising:

a pair of closable jaws situated opposite to one another, the jaws being adapted to receive the bottom end of a tube between them while they are open and to collapse the walls of the tube as they close;

a spring resisting closure of the jaws; and a gripping device movable into engagement with the tube as the jaws open and out of engagement with the tube as the jaws close, the jaws being driven toward the top of the tube as the gripping device moves into engagement with the tube.

2. The apparatus of claim 1, in which the gripping device comprises a pair of fingers on opposite sides of the tube.

3. The apparatus of claim 1, in which the gripping device comprises a finger coupled to the spring such that the restoring force of the spring drives the jaws toward the top of the tube.

4. The apparatus of claim 1, in which the jaws have cylindrical surfaces that engage the tube when the jaws close and disengage from the tube when the jaws open.

5. The apparatus of claim 4, in which the cylindrical surfaces have shallow, serrated grooves transverse to the length of the tube.

6. The apparatus of claim 2, in which the spring is bowed, transverse rotatable rods are fixed to the ends of the spring, and the fingers extend radially inward from the rods such that as the jaws close the spring becomes less bowed, thereby rotating the fingers toward the top end of the tube.

7. The apparatus of claim 6, in which the rods lie in transverse grooves on the outside of the jaws to hold the jaws together, the rods rotating in their grooves as the jaws are closed.

8. The apparatus of claim 2, in which the spring extends between the jaws, is bowed away from the jaws, and straightens as the jaws close, the fingers extend inwardly toward the tube, and the fingers are coupled to the ends of the spring to rotate with them as the spring straightens.

9. The apparatus of claim 1, in which the jaws are driven towards the top of the tube responsive to the restoring force of the spring as the jaws close.

10. The apparatus of claim 1, in which the gripping device comprises at least one pair of pincers between which the tube is gripped as the jaws open.

11. Apparatus for expelling the contents of a collapsible tube container comprising:

a pair of closable jaws disposed to receive the bottom end of a tube therebetween and to collapse the tube therebetween in moving from an opened position to a closed position; and spring means for urging the jaws into their open position and against which the jaws must be driven to their closed position, and means powered by the spring means in moving the jaws from their closed position to their open position for advancing the jaws along the tube.

12. Apparatus according to claim 11 wherein the jaws have opposing cylindrical tube engaging surfaces extending transversely of the tube, and wherein the spring means is effectively connected to each of the jaws at a location spaced from the center of curvature of said surface on the jaw.

13. Apparatus according to claim 12 wherein the spring means includes a spring element having a bow portion and an anchor portion disposed adjacent each end of the bow portion, the spring element anchor portions cooperating with the jaws for connecting the spring element to the jaws, the anchor portions being rotatable relative to the jaws during movement of the jaws between the open and closed positions thereof.

14. Apparatus according to claim 13 wherein the spring element bow portion is arranged to have its greatest curvature when the jaws are in their open position, and wherein the spring element and the jaws are cooperatively arranged to move the spring element anchor portions apart from each other in movement of the jaws from their open position to their closed position.

15. Apparatus according to claim 14, wherein the spring element defines grip means which move into engagement with the tube during a terminal portion of movement of the jaws from their closed to their open positions for securing the spring element from gross movement relative to the tube.

16. Apparatus according to claim 15 wherein said grip means are defined at opposite ends of the spring element.

17. Apparatus according to claim 16 wherein said apparatus includes only one spring element and the grip means engage only one side of the tube.

18. Apparatus according to claim 16 wherein the apparatus includes two said spring elements and the grip means of each spring element engage opposite sides of the tube.

19. Apparatus according to claim 15 wherein the grip means are defined intermediate said box portion of the spring element.

20. Apparatus according to claim 19 wherein the apparatus includes only one spring element having a box portion adjacent each end thereof, and each said bow portion includes said grip means.

21. Apparatus according to claim 19 wherein the grip means is arranged to engage opposite sides of the tube.

22. Apparatus for expelling the contents of a collapsible tube container comprising:

a pair of closable jaws situated opposite to one another, the jaws being adapted to receive the bottom end of a tube between them while they are open and to collapse the walls of the tube as they close;

cylindrical surfaces on the jaws engaging the tube as the jaws close, the cylindrical surfaces having parallel axes about which the jaws rotate as they open and close;

two springs extending between the jaws for resisting the closure of the jaws, one being located on either side of the jaws, the springs deforming as the jaws close and having transverse rods at either end that hold the jaws together, the rods lying in grooves on the outside of the jaws, and the grooves being spaced from the axes of the cylindrical surfaces; and a finger is attached to each rod, the fingers associated with each spring extending radially inward toward each other, such that the fingers engage the tube when the jaws are opened, the springs rotate the fingers out of engagement with the tube toward the top of the tube as the jaws close, and the springs rotate the fingers into engagement with the tube toward the bottom of the tube as the jaws open to advance the jaws.

23. Apparatus for expelling the contents of a collapsible tube container comprising:

a pair of closable jaws situated opposite one another, the jaws being adapted to receive the bottom end of a tube between them while they are open and to collapse the walls of the tube as they close;

cylindrical surfaces on the jaws engaging the tube as the jaws close, the cylindrical surfaces having parallel axes about which the jaws rotate as they open and close;

two springs extending between the jaws for resisting the closure of the jaws, one being located on either side of the jaws, the springs deforming as the jaws close and being bowed such that they rotate as the jaws open and close;

first and second transverse rods connecting one end of the respective springs to first and second fingers extending radially inward to engage the tube when the jaws are open;

a third rod connecting the other end of the springs together;

the jaws are held opposite to one another by the first, second and third rods;

the first, second and third rods are offset from and parallel to the axes of their respective jaws;

a tongue is formed in the third rod that pushes against the adjacent jaw as the springs rotate;

the springs rotate the fingers out of engagement with the tube toward the top of the tube as the jaws close; and the springs rotate the fingers into engagement with the tube toward the bottom of the tube as the jaws open to advance the jaws.

24. Apparatus for expelling the contents of a collapsible tube container comprising:
   a pair of closable jaws situated opposite one another, the jaws being adapted to receive the bottom end of the tube between them while they are open and to collapse the walls of the tube as they close;
   cylindrical surfaces on the jaws engaging the tube as the jaws close, the cylindrical surfaces having parallel axes about which the jaws rotate as they open and close;
   two springs extending between the jaws for resisting the closure of the jaws, one being located on either side of the jaws, the springs deforming as the jaws close and being normally bowed such as to straighten out as the jaws open;
   the springs have transverse rods at both ends between which the jaws are held opposite to one another;
   the rods are offset from and parallel to the axes of their respective jaws;
   a pair of pincers is formed at the center of each spring; the tube lies between the pincers;
   the pincers open as the springs straighten out to move out of engagement with the tube; and
   the pincers close when the springs are restored to their normally bowed condition to move into engagement with the tube and advance the jaws.

25. Apparatus for expelling the contents of a collapsible tube container comprising:
   a pair of closable jaws situated opposite one another, the jaws being adapted to receive the bottom end of the tube between them while they are open and to collapse the walls of the tube as they close;
   cylindrical surfaces on the jaws engaging the tube as the jaws close, the cylindrical surfaces having parallel axes about which the jaws rotate as they open and close; and
   two springs extending between the jaws for resisting the closure of the jaws, one being located on either side of the jaws, the springs deforming as the jaws close and being normally bowed such that they begin to straighten as the jaws close, the jaws having sideward extensions against which the springs move as they straighten to stop their deformation and to limit the movement of the jaws.